Nov. 5, 1963 R. W. HERR 3,109,572
APPARATUS FOR STORING MOVING STRIP MATERIAL
Filed Nov. 14, 1961 7 Sheets-Sheet 5
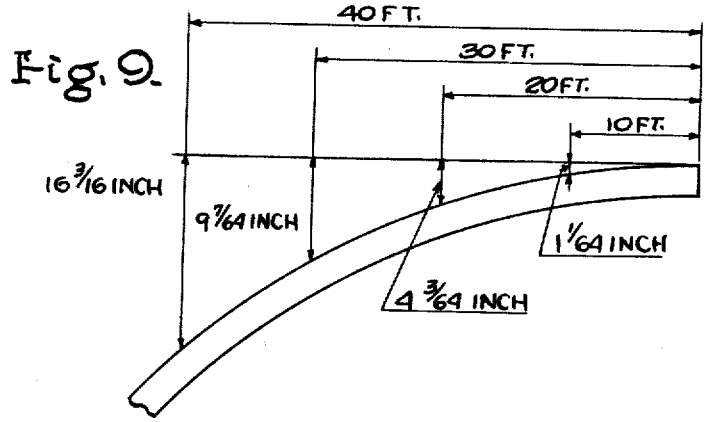
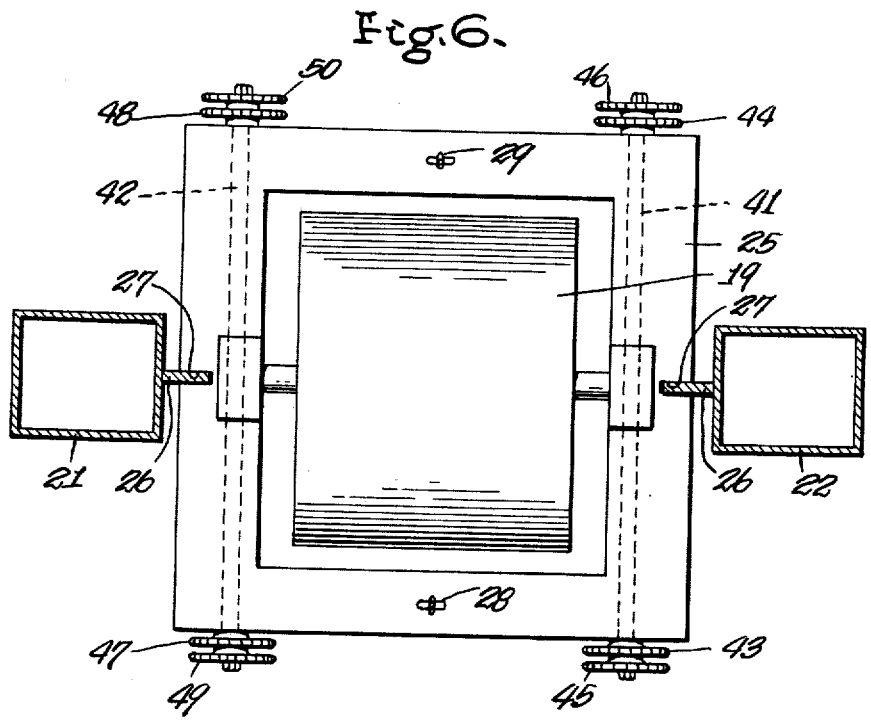
INVENTOR.
RICHARD W. HERR
BY
Michael Williams
ATTORNEY

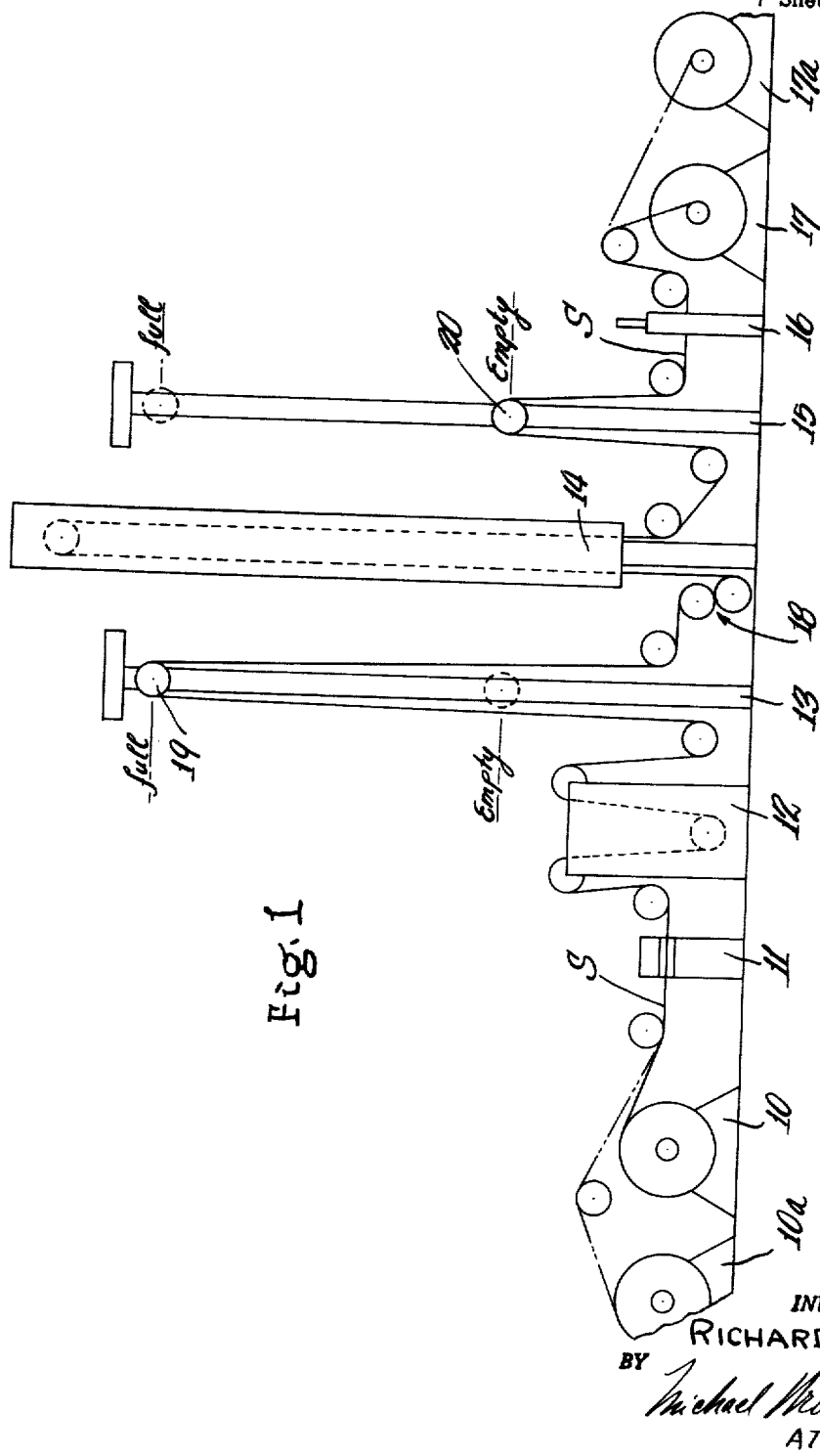

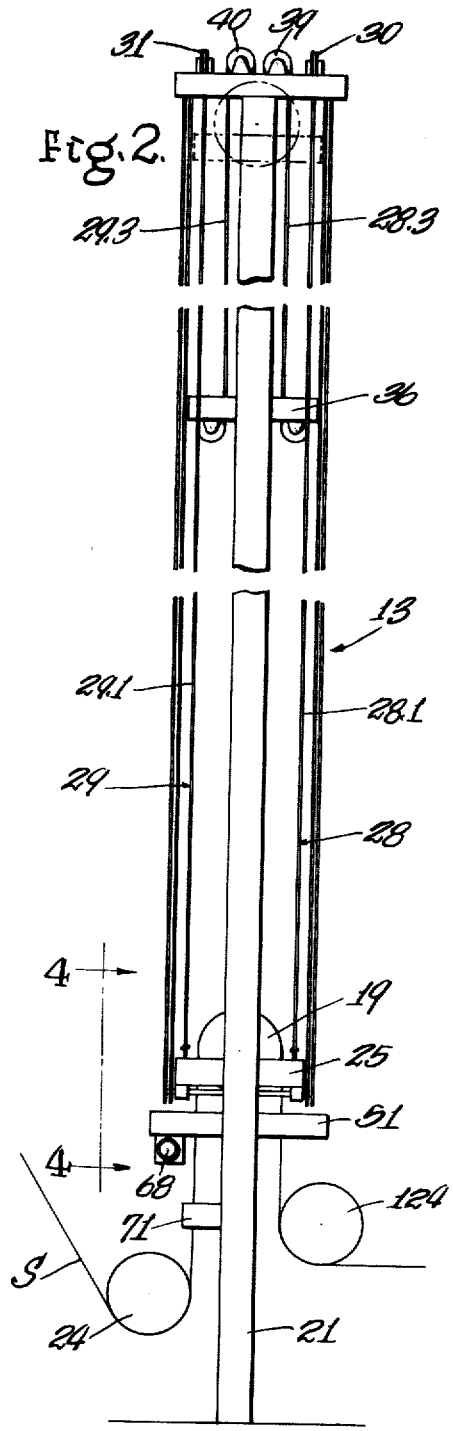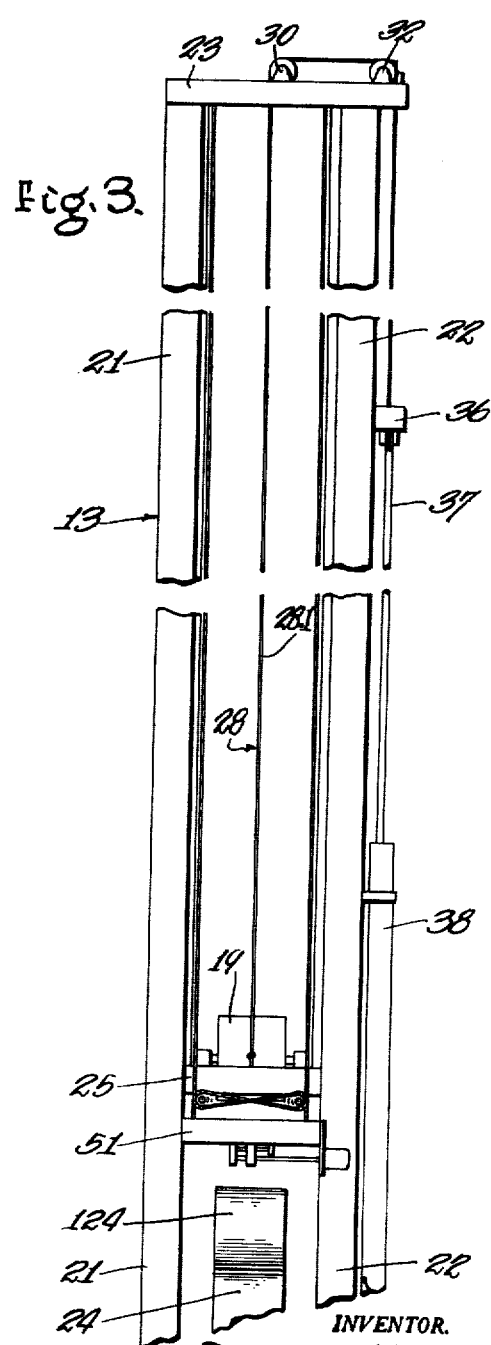

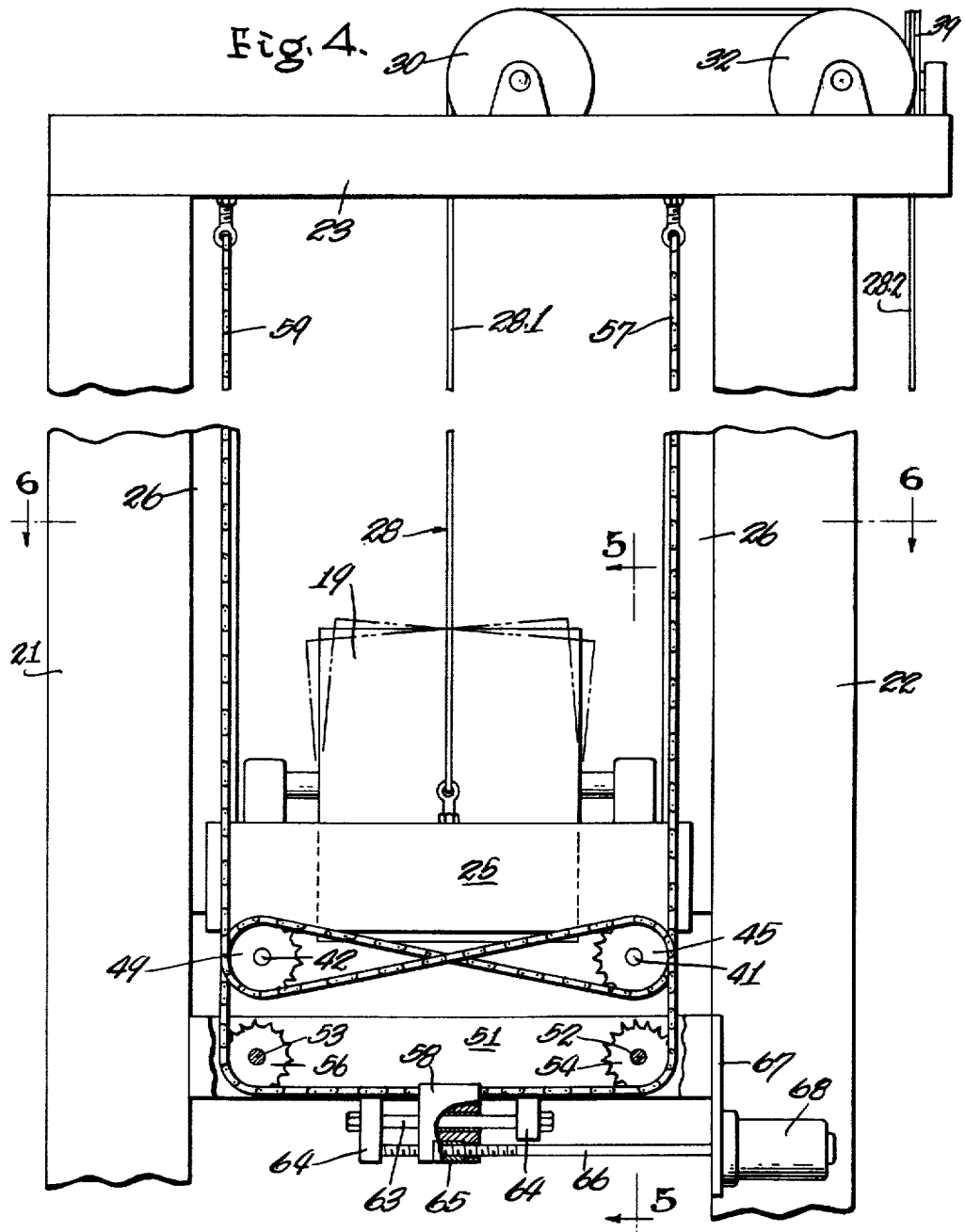

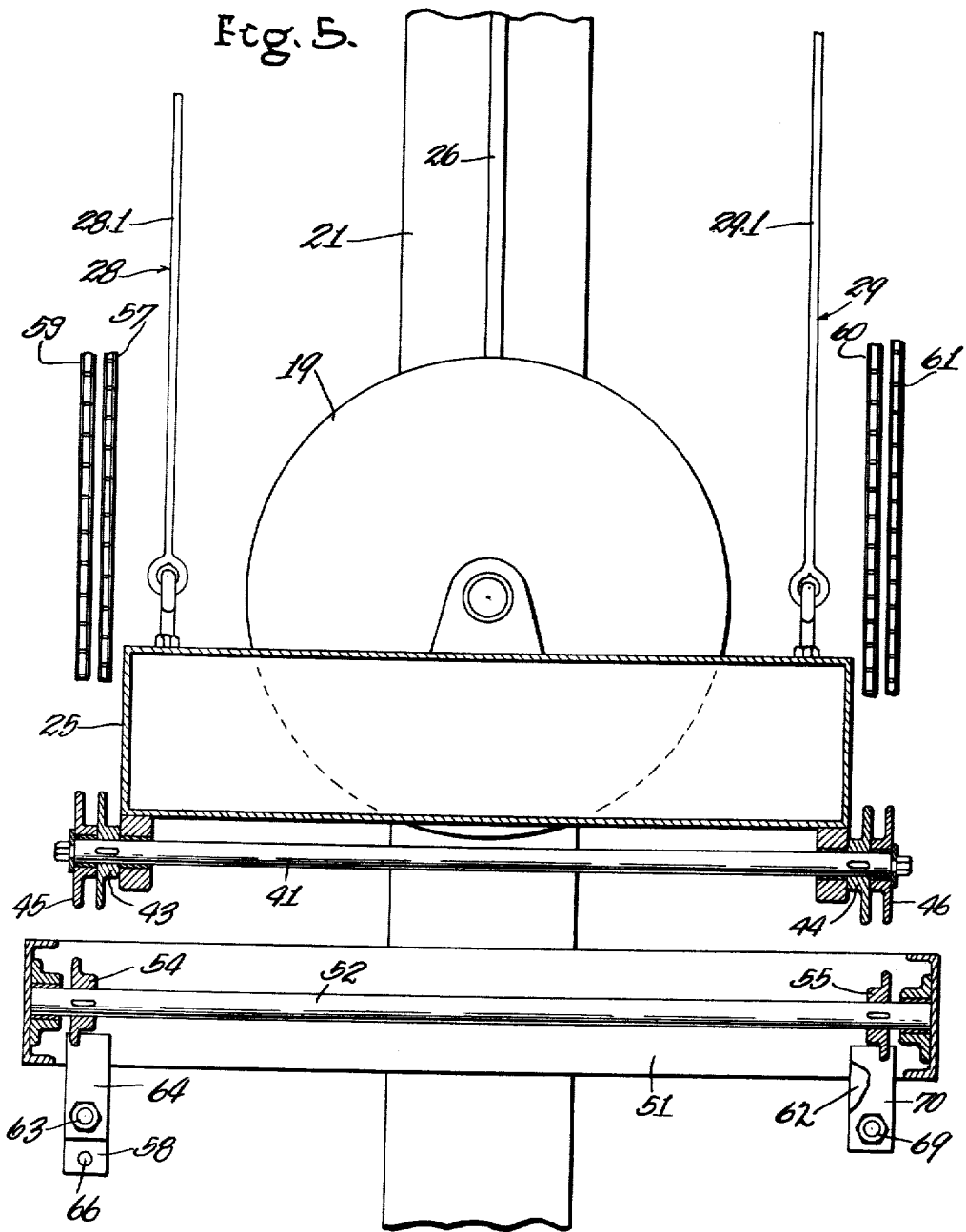

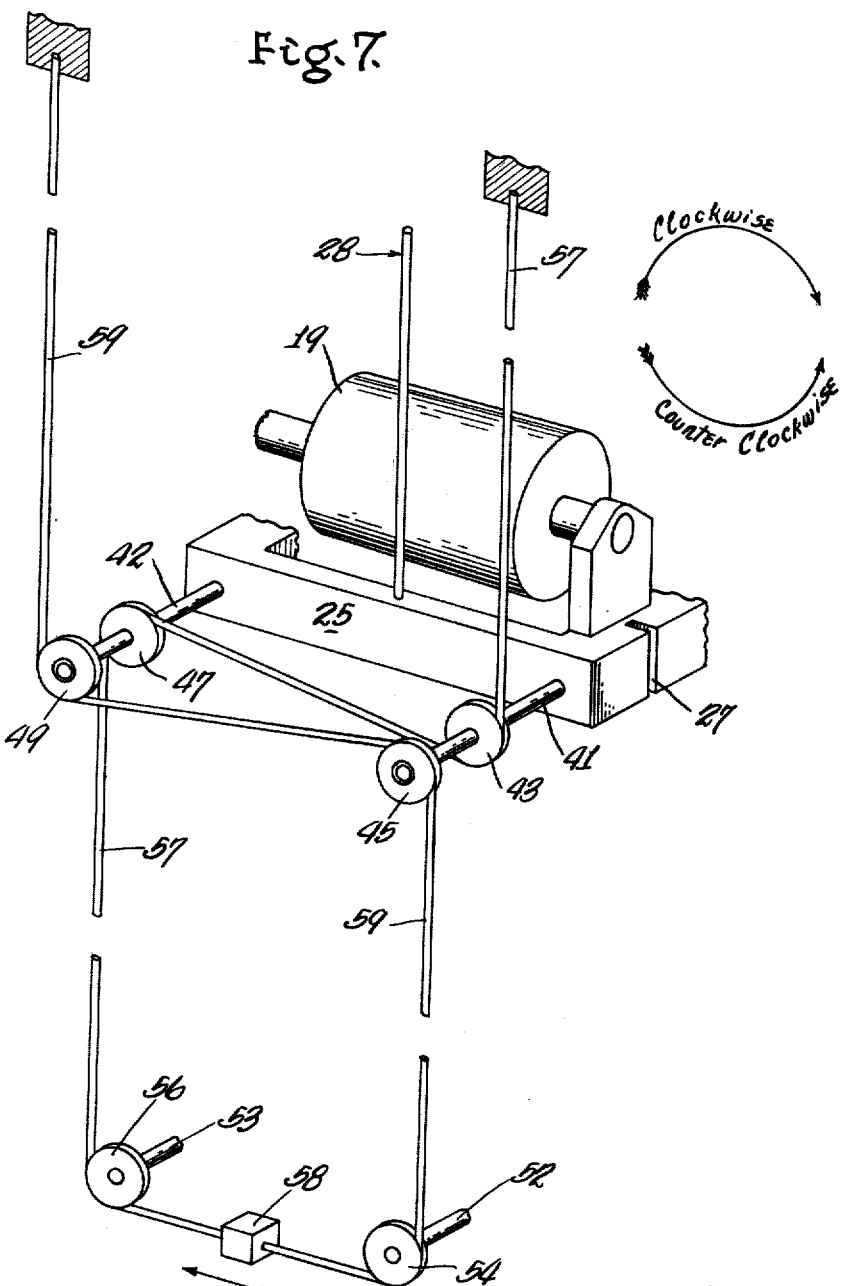

Nov. 5, 1963  R. W. HERR  3,109,572
APPARATUS FOR STORING MOVING STRIP MATERIAL
Filed Nov. 14, 1961  7 Sheets-Sheet 7
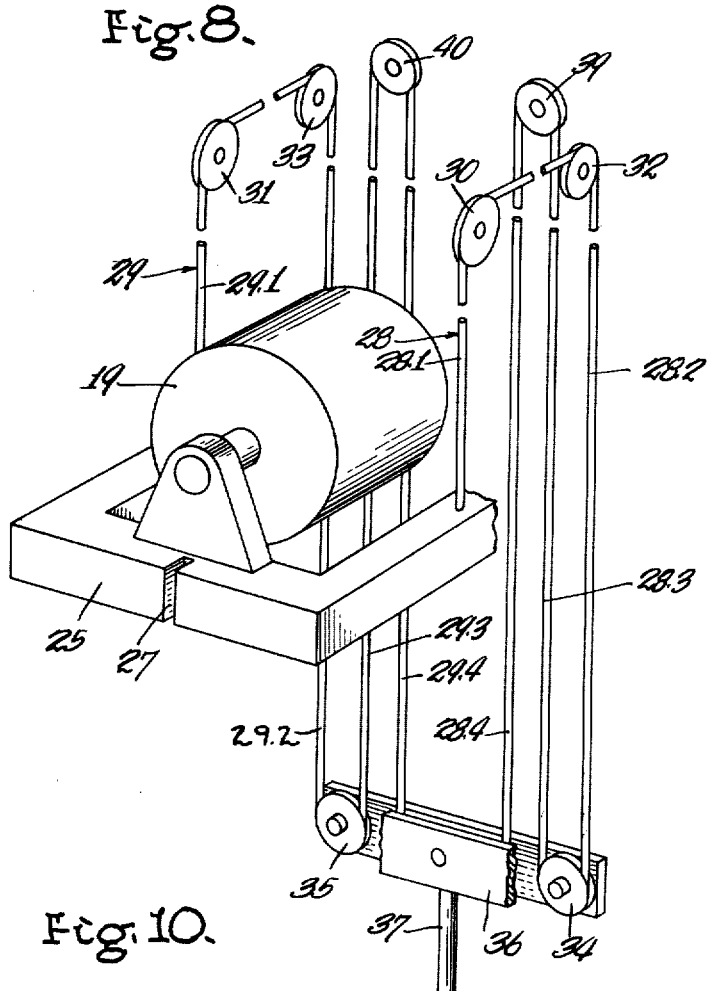
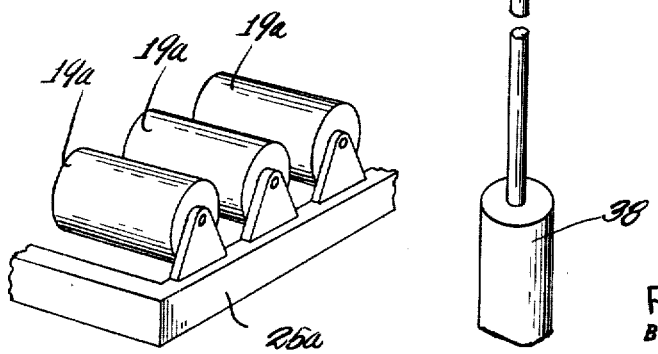
INVENTOR.
RICHARD W. HERR
BY
ATTORNEY

United States Patent Office 3,109,572
Patented Nov. 5, 1963

3,109,572
APPARATUS FOR STORING MOVING STRIP
MATERIAL
Richard W. Herr, Cortland, Ohio, assignor, by mesne assignments, to Rio Algom Mines Limited, Toronto, Ontario, Canada, a corporation of Canada
Filed Nov. 14, 1961, Ser. No. 152,319
6 Claims. (Cl. 226—189)

The present invention relates to strip material accumulators, more particularly to devices for storing variable quantities of longitudinally moving strip material, and the principal object of the invention is to provide new and improved accumulators of the character described.

Much modern production equipment is designed to utilize strip material which is generally supplied in coil form. While coils of strip material over the years have continually grown larger, there is, of course, a practical limit to coil size. Since only so much strip can be placed in any one coil, a problem is presented when the production equipment has used upon all the strip in a given coil.

With some production equipment, no serious problem exists since when one coil of material has been consumed, the leading end of another coil of material may be fed into the equipment. Unfortunately, however, certain types of equipment require the trailing end of one coil to be fastened to the leading end of another coil to, in effect, form an unbroken supply of incoming material. When the production equipment can be shut down, or at least slowed, during the strip joining operation, few difficulties are encountered. It is when the production equipment must operate continuously at high rates of speed that problems arise in holding the trailing strip end stationary long enough for the leading end of another strip end to be secured thereto.

To provide for continuous movement of strip through a strip processing line while a portion of such strip is held immobilized, apparatus known as strip accumulators are employed. Devices of this character may either function to temporarily receive strip without dispensing it (or to dispense it at a slower rate than that at which it is received), or function to temporarily dispense strip while none is being received (or while it is being received at a rate slower than that at which it is being dispensed).

In the past, a common type of accumulator has been a looping pit which merely consisted of a pit in which a loop of strip material could be disposed. Such pit, when full, that is, when a loop of material of maximum size is disposed therein, can temporarily dispense strip from the strip loop even though strip is not being fed into the pit. Alternatively, an empty pit can temporarily receive strip even though no strip is being drawn from the pit.

While looping pits are simple and have been widely used in the past, they have certain disadvantages: Firstly, since the strip hangs loosely in the pit, it may readily twist, thus possibly damaging the strip or in an extreme case it may even cause jamming of the line necessitating a complete shutdown. Secondly, the strip disposed in the looping pit not infrequently touches the pit sides or bottom, or adjoining strip loop portions touch each other. This can cause damage to the strip where it is of delicate nature or where its surface is highly polished, painted, or otherwise readily damaged by abrasion. Thirdly, the amount of strip which must be stored for modern, high-speed lines requires a pit of impractical depth. For example, the principal embodiment of the invention hereinafter to be described stores an amount of strip equal to that which would require a pit approximately fifty feet deep. Such embodiment, however, is purely illustrative since designs are contemplated which would require pits hundreds of feet deep to accommodate the same amount of strip.

As an alternative to the looping pit, strip accumulators have been proposed of the type having transversely spaced rolls over which the strip is looped, the rolls being transversely movable toward and away from each other, to vary the amount of strip looped over the rolls. Such an accumulator type is illustrated in Letters Patent #2,785,891. Such accumulator, however, while suitable for narrow width strip of relatively heavy gauge, is not satisfactory for much of the strip material presently being processed.

Strip material is generally considered to be reasonably straight; however, commercial grades of strip rarely are. For technical reasons which need not presently be explored, most commercial grades of strip, especially in the wider widths, are cambered. More specifically, opposed strip edges, while generally parallel, have a slight curvature which causes a strip edge to deviate from a straight line as much as several feet in a long length of strip. Since a strip processing line may have hundreds of feet of strip extending through it and over dozens of strip supporting and or driving rolls, the positioning of such rolls so that the strip will not run off either roll end presents a problem.

If all of the strip were cambered the same amount and in the same direction, it would be a simple matter to arrange the processing line rolls and other working parts of the line in a path to accommodate the camber of the strip. Unfortunately, strip camber is not necessarily constant, either in direction or amount, between successive coils of strip, or even in longitudinally spaced strip portions of a single coil of strip. Accordingly, strip processing lines are set up as though the strip were perfectly straight and the cambered strip is then compelled, by various means, to follow the desired path through the line.

In many cases, especially where the strip is quite heavy gauge, various types of edge guides can be used to insure that the strip tracks properly, that is, remains substantially centered on the rolls over which it travels. Unfortunately, however, edge guiding cannot be used in a great many applications since damage to the strip edge would result.

To effectuate strip tracking without edge guiding, rubber covered rolls having a textured periphery, such as disclosed in Letters Patent to E. T. Lorig, #2,592,581, have been used. However, while these roll types work well under some circumstances, they have a rather short operating life, they cannot be used under high-temperature operating conditions, and they are not fully effective where strip camber is severe. Where the so-called Lorig-type rolls are inadequate, resort must be had to tilting the axis of certain of the rolls over which the strip travels so as to actually steer the strip to insure proper tracking thereof through the line. The use of such steering rolls, either alone or in combination with the "Lorig" rolls, is quite satisfactory, especially when the rolls are steered in accordance with a strip-edge sensing device which monitors the position of a strip edge.

Depending upon the size and type of strip material, the magnitude of its camber, and other factors, there is a maximum to the distance which the steering rolls can be spaced longitudinally of the strip. Obviously, with badly cambered strip, too great a distance between adjoining steering rolls results in failure to steer the strip with sufficient accuracy to effect proper tracking thereof.

The present invention provides an accumulator device in which the shiftable roll (or rolls), which varies the storage capacity of the accumulator, is steerable by means of a novel, low-cost, efficient and trouble-free structure. Other advantages will become apparent from a study of a the following description and from the drawings appended hereto.

In the drawings accompanying this specification and forming a part of this application there is shown, for purpose of illustration, embodiments which the invention may assume, and in these drawings:

FIGURE 1 is a generally diagrammatic side elevational view of a typical strip-annealing processing line, FIGURE 2 is an enlarged, broken, fragmentary, side elevational view of certain apparatus seen in FIGURE 1, FIGURE 3 is an end elevational view of the apparatus seen in FIGURE 2, FIGURE 4 is an enlarged, broken, fragmentary view generally corresponding to the line 4—4 of FIGURE 2, FIGURE 5 is a sectional view generally corresponding to line 5—5 of FIGURE 4, FIGURE 6 is a sectional view generally corresponding to the line 6—6 of FIGURE 4, FIGURE 7 is a diagrammatic, fragmentary representation of a portion of the apparatus seen in FIGURE 4, FIGURE 8 is a diagrammatic, fragmentary representation of other portions of the apparatus seen in FIGURE 4, FIGURE 9 is an exaggerated portion of the strip material which is handled by the line seen in FIGURE 1, and FIGURE 10 is a reduced size, fragmentary view similar to FIGURE 5 but of another embodiment of the invention.

With reference to FIGURE 1 wherein a more or less typical strip material processing line is illustrated in which the strip S travels from left to right, there is shown on the left a pay-off reel 10 for rotatably supporting a coil of strip, a welder 11 whose purpose will later appear, a degreaser 12, an entry accumulator 13, a furnace 14, an exit accumulator 15, a shear 16, and a coiler 17 for winding strip to coil form. As will be evident, various rolls support the strip S in its passage through the several parts of the line. Also included in the line is a pay-off reel 10a (similar to 10) and a coiler 17a (similar to 17) for purposes to be disclosed.

For purpose of illustration, the present processing line has but a single function; i.e., to anneal highly polished strip material such as stainless steel strip. To accomplish this purpose, the strip is passed through the furnace 14 which subjects the strip to annealing temperatures. Since the strip passes through the furnace at, for example, sixty feet per minute, the furnace must be operated at a very high temperature (for example, 2200 degrees F.) in order to raise the temperature of the strip to that required for annealing in the short time it is in the oven. If, at a given furnace temperature, the strip passes through the furnace too quickly, it will not be properly annealed. On the other hand, if the strip passes through too slowly, it will be heated to excess, thus damaging the surface of the strip or even more seriously injuring it. Indeed, one processing line of the type herein disclosed requires that the speed of the strip through the furnace be held constant with an allowable variation of but one-half of one percent. To accomplish such accurate speed regulation, the strip passes through a set of bridle rolls 18 adjacent to the furnace whose speed is very accurately controlled and which establish the rate at which the strip passes through the furnace.

Briefly, entry accumulator 13 comprises a plurality of rolls which support the strip in loop formation. The upper roll 19 of this accumulator is vertically movable so as to increase or decrease the size of the strip loop to thus vary the accumulator's strip storage capacity. Exit accumulator 15 may be identical to 13, having a vertically movable upper roll 20.

Assuming the leading end of the coil of strip carried by the pay-off reel 10 is threaded through the various pieces of apparatus constituting the present line and is connected to the empty coiler 17, operation will be as follows: The strip will be fed through the furnace at a rate consistent with proper annealing of the strip while the coiler 17 functions to wind up the strip as fast as it leaves the furnace. For reasons to appear, the upper roll of the exit accumulator 15 remains in its lowermost position shown wherein a minimum amount of strip is disposed therein.

Pay-off reel 10 will initially be operated at a rate far in excess of that at which the strip is passing through the furnace so as to fill the entry accumulator 13 with strip. With this device full, its roll 19 will be in the uppermost position shown wherein a maximum amount of strip is disposed therein. When the entry accumulator is filled, pay-off reel 10 will be operated to dispense strip at the same rate as that at which it is passing through the furnace. The operation will continue, as above outlined, until, for example, the coil carried by pay-off reel 10 becomes exhausted whereupon the trailing end of the strip will be gripped and held immobilized by a suitable clamp mechanism (not shown) adjacent the welder 11. While the strip remains clamped, the full entry accumulator 13 will discharge strip to the furnace 14, by gradually reducing the size of the loop of strip stored therein, so that the furnace can continue functioning at its optimum continuous rate.

While the trailing strip end is clamped as above mentioned, the leading end of another coil carried by the pay-off reel 10a will be brought over the reel 10 and to the welder 11 where it will be welded to the trailing strip end aforesaid. Following the joinder of the strip ends, the strip will be unclamped for passage once again to the entry accumulator 13, the pay-off reel 10a first operating at a high rate of speed to refill the depleted entry accumulator and thereafter operating at line speed until its coil is depleted. While pay-off reel 10a is dispensing strip, another full coil will be set up on pay-off reel 10 for use upon depletion of the coil on reel 10a.

When coiler 17 has wound up a coil of suitable size, the strip will be gripped and held immobilized by a suitable clamp mechanism (not shown) adjacent the shear 16. While the strip remains clamped, the empty exit accumulator 15 will absorb strip discharged from the furnace 14, by gradually increasing the size of the loop of strip stored therein, so that the furnace continues functioning at its optimum continuous rate. Shear 16 will transversely sever the clamped strip and the strip end leading from the exit accumulator will be fastened to the empty coiler 17a. The strip can now be unclamped and the coiler 17a operated to coil the strip thereon at a very high rate so as to empty the now partially filled exit accumulator 15. When the latter is once again emptied, the operational rate of coiler 17a will be reduced to line speed until a coil of the required size has been built up thereon. While strip is being coiled on coiler 17a, the strip previously coiled on coiler 17 will be removed so as to ready the latter for operation when coiler 17a is filled.

From the foregoing operational sequence, it will be clear that the entry accumulator 13 operates at full strip storage capacity at all times except when the entry end of the line is stopped to change coils and the short period thereafter while this accumulator is being refilled. Conversely, the exit accumulator 15 operates at minimum strip storage capacity except when the exit end of the line is stopped to switch from one coiler to another and the short period thereafter while this accumulator is being emptied.

In the past, while various rolls of the line may have functioned to keep the strip tracking properly, strip within the entry accumulator continually caused trouble in that the great length of strip stored therein could not be compelled to properly track. On the other hand, the exit accumulator is relatively trouble-free since it operates at minimum capacity most of the time. Bearing in mind that the rolls in processing lines over which the strip passes are usually about six inches wider than the width of the strip, even a slight amount of camber in a strip can cause it to run off the edge of the roll if it is not guided or steered. As viewed in FIGURE 9, the edge of commercial strip can deviate from a straight line as much as one and one 64th inches in a ten foot length of strip. This is equivalent to the industry tolerance of one quarter inch in ten feet where the one quarter inch dimension represents the distance between the arcuate strip edge and the center of a rectilinear chordal line having a length of ten feet. This deviation becomes one of over four inches in a twenty foot length of strip, over nine inches in thirty feet and over sixteen inches in forty feet. Quite obviously, proper strip tracking becomes a real problem in accumulators designed to operate for protracted periods with up to one hundred or more feet of strip stored therein.

In order to alleviate the strip tracking problems in prior art entry accumulators, they are frequently operated empty, rather than full, until just before the coil on the pay-off reel is depleted. This is a very dangerous practice since a slight error in judgment can result in not enough strip being stored to permit continuous furnace operation during the change-over from one pay-off reel to the other. In such case, the line must be stopped, thus damaging hundreds of dollars worth of strip. Furthermore, if this strip should break because of a loss of tensile strength caused by overheating or, if for some other reason, the line would require rethreading, eight hours or more of lost production time could easily result since the furnace must in such case be purged of its reducing atmosphere, cooled, rethreaded, recharged with its reducing atmosphere, and raised once again to its operating temperature.

In the accumulator about to be described in detail, strip tracking presents no problem, even under full strip-storage operation, since the stored length of strip is steered intermediate its ends.

With reference now to FIGURES 2 and 3, wherein is illustrated the entry accumulator 13, the latter is presently shown to comprise a pair of upright, spaced-apart columns 21, 22 joined at their upper ends by a bridging structure 23. Rolls 24, 124 are suitably supported at the base of the columns, the strip S passing under such rolls as shown and over the previously mentioned roll 19 to form a loop in the strip.

Supported for vertical movement by the columns 21, 22 in a manner to be disclosed is a generally rectangular carriage 25 (see especially FIGURE 6) which rotatably supports the roll 19. For a purpose to appear, the facing surfaces of the columns each have a longitudinally extending rib 26 and such ribs are slidably accommodated in respective slots 27 formed in the carriage.

Considering first the carriage supporting structure and thereafter the carriage equalizing structure, it is to be noted that a pair of cables 28, 29 are secured to the carriage on opposite sides of the roll axis and at places lying in a plane which is both normal to the roll axis and which bisects such roll. Such cables have respective reaches 28.1, 29.1 which extend upwardly over respective sheaves 30, 31 carried by the bridge structure 23 and over respective sheaves 32, 33. Respective cable reaches 28.2, 29.2 depend from the sheaves 32, 33 and pass under respective sheaves 34, 35 carried by a cross arm 36 secured to the piston rod 37 of a vertically disposed fluid cylinder 38. Extending upwardly from the sheaves 34, 35 are respective cable reaches 28.3, 29.3 which pass over respective sheaves 39, 40 carried by the bridging structure. From the sheaves 39, 40, respective cable reaches 28.4, 29.4 extend downwardly to respective anchorages on the cross arm 36. The carriage supporting structure is diagrammatically represented in FIGURE 8 wherein the operable relationship of the respective parts may more easily be seen.

As viewed in FIGURE 3, cylinder 38 is connected to the column 22 so that the cross arm 36 can slide vertically therealong during piston rod reciprocation. With particular reference to the diagrammatic view FIGURE 8, it will be understood that fluid pressure within the cylinder 38 from a suitable source will cause the latter to exert a downward force on the cross arm 36. Through the reaches of the supporting cables 28, 29, the carriage 25 and its roll 19 will thus be yieldably biased upwardly to maintain the strip loop which passes over roll 19, taut at all times. When strip is being fed into the loop faster than it is being withdrawn therefrom, carriage 25 will rise, as a result of the force exerted by cylinder 38, to increase the loop size. Conversely, when strip is being withdrawn from the loop faster than it is being fed thereinto carriage 25 will be pulled down, overcoming the force exerted by cylinder 38, to decrease the size of the loop.

With the structure thus far described, it will be understood that the axis of roll 19 is not positively located and could thus tilt whenever the strip exerts a greater force on one end of the roll than on the other. Such a condition, of course, cannot be tolerated since uncontrolled tilting of the roll axis would cause the strip to run off one or the other roll end. While various arrangements could be employed to prevent uncontrolled tilting of the axis, the following structure is presently preferred since it not only prevents uncontrolled tilting of the roll axis but also equalizes vertical movement of respective ends as the roll carriage 25 moves up and down, and further provides an extremely effective means of selectively tilting the roll axis when it is necessary to steer the strip passing over the roll.

Turning now to the means presently employed to control tilting of the axis of roll 19, such means, in brief, utilizes tensioned, flexible members (in the instant case roller chains) along which the roll-carrying carriage 25 is vertically reciprocable.

With reference to FIGURES 4, 5 and 6, horizontal shafts 41, 42 are rotatably supported by the carriage 25 adjacent respective ends of the roll 19. In the present embodiment, a pair of sprockets are carried in side-by-side relation at each end of each shaft and as best shown in FIGURE 5, inboard sprockets 43, 44 are keyed or otherwise secured to shaft 41 for rotation therewith while outboard sprockets 45, 46 are also carried by shaft 41 but are rotatable relative thereto. An identical arrangement is provided by shaft 42, the latter having inboard sprockets 47, 48 keyed to the shaft and outboard sprockets 49, 50 rotatable relative thereto. Note that the inboard sprockets 43, 47 are aligned with each others as are the inboard sprockets 44, 48. Also aligned with each other are the outboard sprockets 45, 49, together with the outboard sprockets 46, 50.

Disposed beneath the carriage 25 and supported in fixed position by the lower portions of columns 21, 22, is a frame 51 which rotatably carries spaced shafts 52, 53 which are parallel with the carriage shafts 41, 42. Keyed or otherwise affixed to shaft 52 for rotation therewith are sprockets 54, 55 respectively aligned with the outboard sprockets 45, 46 of carriage shaft 41. Similarly, shaft 53 has affixed thereto a pair of sprockets 56 which, however, are respectively aligned with the inboard sprockets 47, 48 of the carriage shaft 42.

With reference to FIGURE 4, and on the near side thereof, a roller chain 57 is anchored to bridging member 23 and extends downwardly under and around sprocket 43, over and around sprocket 47, downwardly and under near side sprocket 56, and is secured to a block 58 later to be described in greater detail. Another roller chain 59 is anchored to bridging member 23 and extends downwardly under and around sprocket 49, over and around sprocket 45, downwardly and under sprocket 54, and is secured to the aforesaid block 58.

On the far side of FIGURE 4 (see also FIGURES 2 and 5), but hidden from view by the chains 57, 59, are similar chains 60, 61. Each is anchored to the member 23 and depends therefrom, chain 60 extending downwardly under and around sprocket 44, over and around 48, downwardly and under the far side sprocket 56, and is secured to a block 62 similar to block 58. Chain 61 extends downwardly under and around sprocket 59, over and around sprocket 46, downwardly and under sprocket 55, and is secured to the aforesaid block 62.

A better understanding of the means for controlling tilting of the roller 19 may perhaps be had by reference to the diagrammatic view FIGURE 7 wherein such structure is fragmentarily represented. For simplicity, the chains are shown in this view as cables while the sprockets are shown as sheaves; however, the function of the parts is identical. Indeed, cables and sheaves could, in actual practise, be respectively substituted for the chains and sprockets.

With the parts disposed as seen in FIGURE 7 and assuming the chains 57, 59 to be tensioned to eliminate slack therein, it will be understood that the chain 57, in passing under the sprocket 43 and over the sprocket 47, tends to prevent clockwise rotation of the carriage 25 and thus tilting of the axis of roll 19. This function follows since rotation of the carriage in a clockwise direction tends to shorten the chain and remove any slack therein; however, since there is no slack to be taken up, the carriage will be locked against such clockwise movement.

Conversely, with the chain 59 passing under the sprocket 49 and over the sprocket 45, the carriage will be locked against counter-clockwise movement for the same reasons as above pointed out. Accordingly, the carriage and its supported roll 19 will be thus locked against either clockwise or counter-clockwise movement. It will be clear that the chains 60, 61 function identically and in step with respective chains 57, 59, the chains 60, 61 merely controlling movement of the opposite side of the carriage for balance purposes.

During vertical movement of carriage 25 and the consequent increase or decrease of the size of the strip loop, the carriage-supported sprockets will roll freely along their respective chains while the latter maintain the axis of the carriage-supported roll in a predetermined, for example, horizontal position. The previously mentioned ribs 26, confined within the slots 27 of the carriage, limit horizontal movement of the carriage to a negligible amount.

Still referring to FIGURE 7 and assuming that the axis of roll 19 is too tilted in a clockwise direction to steer the strip passing over the roll, block 58 will be shifted, as indicated by the arrow, to the left. This will lengthen chain 57 while chain 59 will be shortened by an identical amount so that no slack will be introduced in the chains. With the lengthening of chain 57 and the shortening of chain 59, carriage 25 and thus the axis of its supported roll 19 will be rotated a predetermined amount in a clockwise direction to thus tilt the roll axis to effect steering of the strip.

It is to be noted that even with the axis of the roll tilted, vertical carriage movement occurs as before described, the roll axis remaining locked in its tilted position, despite vertical carriage movement, until such time as the block 58 is returned to the central position illustrated. It is also to be noted that as chain 59 is shortened, sprocket 54 will be rotated and since this sprocket is locked to the shaft 52 which carries at its other end the sprocket 55, the latter will also be rotated the same amount and in the same direction so as to also shorten the chain 61 an identical amount. Similarly, the lengthening of chain 57 will be duplicated by the lengthening of chain 60 because the sprockets 56 are interconnected by the shaft 53 for simultaneous movement. In the event the axis of roll 19 is to be tilted in a counter-clockwise direction, block 58 will merely be shifted to the right thus lengthening cables 59, 61 and shortening by the same amount cables 57, 60.

Turning now to FIGURE 4 wherein block 58 is shown in greater detail, the latter is slidable along a rod 63 between spaced brackets 64 which support the rod and are carried by the frame 51. In the present embodiment, block 58 extends beneath rod 63 and is slotted to receive a nut member 65 which threadably engages a threaded shaft 66 whose one end is journaled in an extension of the left-hand bracket 64 and whose other end is journaled in a bracket 67 depending from the frame 51. A suitable motor 68 selectively effects rotation of shaft 66 in opposite directions to reciprocate the nut member 65 and thus the block 58. Insofar as block 62 is concerned, the latter may be mounted in a manner similar to block 58 for sliding movement along a rod 69 supported by spaced brackets 70; however, the means for shifting block 58 may be omitted from block 62 since the sprockets carried by the shafts 52, 53 will insure simultaneous movement of the chains 57, 60 and the chains 59, 61.

While the operation of accumulator 13 has previously been described, it should be understood that the above-disclosed motor 68 is operably connected to a strip edge-sensing device 71 (see FIGURE 2). Such device, since it forms no part of the present invention, need not be described in detail, however, it may consist of a photo-electric cell or the like which senses when the edge of the strip is too far over in one direction or the other. This information is transmitted to the motor 68 which then rotates in the required direction to shift the block 58 and thus tilt the axis of roll 19 to steer the strip so that its sensed edge returns to its desired position.

Although automatic tilting of the axis of roll 19 has been described, it will be obvious that motor 68 and sensing device 71 could be eliminated and the shaft 66 rotated by hand to shift the axis of roll 19 when an operator of the strip line visually determines that a steering correction of the strip is required. Furthermore, while the exit accumulator has not been shown in detail, it may, if desired, be identical to the entry accumulator 13 although, as previously mentioned, the operation of the exit accumulator with cambered strip presents fewer problems than does the entry accumulator since the latter is normally run full of strip while the former is normally run empty.

While the accumulators thus far described employ but a single, bodily shiftable roll over which the strip passes to form a single loop in the strip, it is to be understood that a plurality of rolls could be carried by the carriage so that the strip could be supported in a plurality of loops. Obviously this would increase the strip storage capacity of the accumulator.

As fragmentarily viewed in FIGURE 10 wherein similar parts are identified by the same reference characters as before but with the suffix "a" added, it will be noted that the carriage 25a rotatably supports (in this instance) three rolls 19a in side-by-side parallel relation over which the strip passes to form three loops. Although not shown, additional fixed rolls similar to rolls 24, 124 will be required to support the lower ends of the strip loops.

Carriage 25a may be mounted identically to carriage 25 for vertical movement to thereby increase and decrease the size of the strip loops and thus vary the strip storage capacity and also for tilting movement so that the axis of rolls 19a may be tilted simultaneously for steering of the strip as hereinabove disclosed.

In view of the foregoing it will be apparent to those skilled in the art that I have accomplished at least the principal object of my invention and it will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:
1. A device for storing variable quantities of moving strip material comprising a plurality of rolls over which the strip travels in a loop configuration and one of said rolls being disposed in a bight of the strip loop, a carriage rotatably mounting said one roll, said carriage being vertically movable in a direction transversely of the axis of said one roll to vary the size of the strip loop thus varying the quantity of stored strip, two pairs of guide members rotatably carried by said carriage and one guide member pair being disposed adjacent one end of said one roll and the other guide member pair being disposed adjacent the opposite end of such roll, a first tenuous member extending under a guide member of one guide member pair from a place above said carriage and over a guide member of the other guide member pair to a place below said carriage, a second tenuous member extending under the other guide member of said other guide member pair from a place above said carriage and over the other guide member of said one guide member pair to a place below said carriage, and means for shortening one of said tenuous members and substantially simultaneously lengthening the other to effect tilting of said carriage and consequent tilting of said one roll axis for steering in an edgewise direction the moving strip contained in the strip loop.

2. The construction of claim 1 wherein the strip travels through a plurality of loops, wherein a roll is disposed in the bight of each strip loop, and wherein said carriage rotatably supports each of the rolls disposed in respective strip loop bights.

3. The construction of claim 1 wherein said first and second tenuous members are disposed on one side of the axis of said one roll, wherein such tenuous members and said guide members are duplicated on the opposite side of one roll axis, and wherein corresponding tenuous members on respective sides of said one roll axis are operably joined for simultaneous shortening and lengthening.

4. The construction of claim 3 wherein each of said tenuous members comprises a chain and wherein each guide member comprises a sprocket operably engaged with respective chains.

5. The construction of claim 4 wherein corresponding sprockets on opposite sides of said roll axis are connected together for unitary rotation to insure in-phase movement of the carriage portions on said opposite, roll axis sides.

6. The construction of claim 3 wherein each of said tenuous members comprises a chain, wherein each pair of guide members comprises a pair of sprockets in side-by-side, concentric relation, wherein the sprocket pairs on opposite sides of the roll axis are in concentric relation, and wherein adjoining sprockets on opposite sides of the roll axis are affixed to a single shaft for unitary rotation to insure in-phase movement of the carriage portions on said opposite, roll axis sides.

References Cited in the file of this patent

UNITED STATES PATENTS

| 2,590,699 | Heyer | Mar. 25, 1952 |
| 2,797,089 | Lorig | June 25, 1957 |
| 2,808,258 | Waychoff | Oct. 1, 1957 |

FOREIGN PATENTS

| 834,014 | Great Britain | May 4, 1960 |

UNITED STATES PATENT OFFICE
CERTIFICATE OF CORRECTION

Patent No. 3,109,572                                  November 5, 1963

Richard W. Herr

It is hereby certified that error appears in the above numbered patent requiring correction and that the said Letters Patent should read as corrected below.

Column 6, line 47, for "others" read -- other --; column 10, line 2, after "of" insert -- said --.

Signed and sealed this 28th day of April 1964.

(SEAL)
Attest:

ERNEST W. SWIDER

Attesting Officer

EDWARD J. BRENNER

Commissioner of Patents